(12) United States Patent
Brenna

(10) Patent No.: US 10,319,142 B2
(45) Date of Patent: Jun. 11, 2019

(54) METHOD FOR VISUALIZING THREE DIMENSIONAL DATA

(71) Applicant: MY VIRTUAL REALITY SOFTWARE AS, Oslo (NO)

(72) Inventor: Roy Morten Brenna, Porsgrunn (NO)

(73) Assignee: MY VIRTUAL REALITY SOFTWARE AS, Oslo (NO)

( * ) Notice: Subject to any disclaimer, the term of this patent is extended or adjusted under 35 U.S.C. 154(b) by 0 days.

(21) Appl. No.: 15/900,573

(22) Filed: Feb. 20, 2018

(65) Prior Publication Data

US 2018/0240269 A1  Aug. 23, 2018

(30) Foreign Application Priority Data

Feb. 20, 2017 (EP) .................................. 17156960

(51) Int. Cl.
*G06F 3/00* (2006.01)
*G06T 17/00* (2006.01)
(Continued)

(52) U.S. Cl.
CPC ............ *G06T 17/00* (2013.01); *G06T 7/0006* (2013.01); *G06T 11/20* (2013.01); *G06T 19/20* (2013.01);
(Continued)

(58) Field of Classification Search
CPC ...... G01C 15/002; G01C 15/06; G06T 17/00; G06T 2207/10024; G06T 2207/10028; G06T 7/0044; G06T 7/74
See application file for complete search history.

(56) References Cited

U.S. PATENT DOCUMENTS 7,672,500 B2   3/2010   Albeck et al.
9,797,706 B2 * 10/2017   Jordil .................. G01B 21/047
(Continued)

FOREIGN PATENT DOCUMENTS

DE   195 44 240 A1   6/1996
EP   2 913 148 A1   9/2015
(Continued)

OTHER PUBLICATIONS

European Search Report in Application No. 17156960.1, dated Jul. 19, 2017.

*Primary Examiner* — Martin Mushambo
(74) *Attorney, Agent, or Firm* — Maschoff Brennan

(57) ABSTRACT

A method for visualizing deviations between nominal data and actual data of a three-dimensional object. The method includes providing deviation data for measurement points on the surface of the object comprising a deviation value describing a deviation between a nominal value and a measured value, selecting a subset of the multitude of measurement points, generating a two-dimensional surface model of the object, wherein the surface model comprises a multitude of pixels, the selected measurement points are positioned on the surface model according to their position on the object, and each pixel is assigned an index depending on the deviation value of the nearest selected measurement point, and visualizing a representation of at least a part the object to a user, thereby visualizing at least a part of the pixels, each pixel being assigned an optical code according to its index.

15 Claims, 5 Drawing Sheets

(51) Int. Cl.
*G06T 11/20* (2006.01)
*G06T 7/00* (2017.01)
*G06T 19/20* (2011.01)

(52) U.S. Cl.
CPC .... *G06T 2215/16* (2013.01); *G06T 2219/021* (2013.01); *G06T 2219/2012* (2013.01)

(56) References Cited

U.S. PATENT DOCUMENTS

| | | | | |
|---|---|---|---|---|
| 2004/0189944 | A1* | 9/2004 | Kaufman | G01B 11/2513 352/10 |
| 2014/0286536 | A1* | 9/2014 | Pettersson | G01C 15/002 382/106 |
| 2015/0049186 | A1* | 2/2015 | Pettersson | G01B 21/047 348/135 |
| 2016/0353083 | A1* | 12/2016 | Aoki | H04N 13/246 |

FOREIGN PATENT DOCUMENTS

| | | |
|---|---|---|
| EP | 3 104 118 A1 | 12/2016 |
| WO | 2013/083730 A1 | 6/2013 |

* cited by examiner

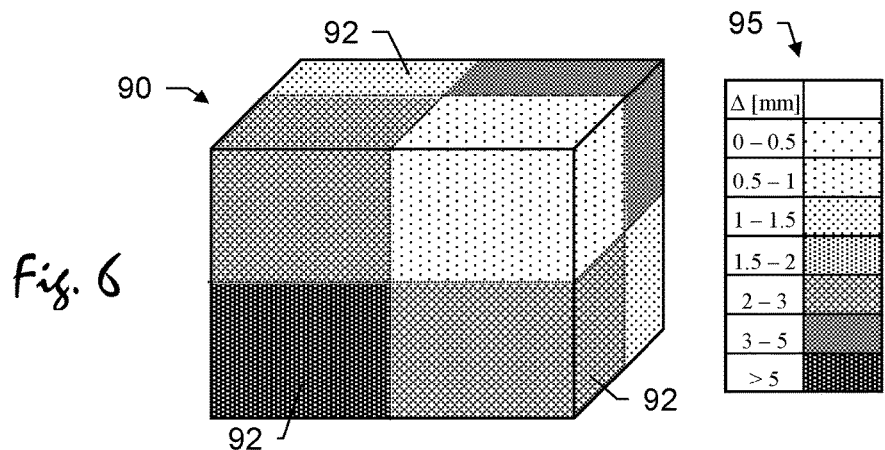
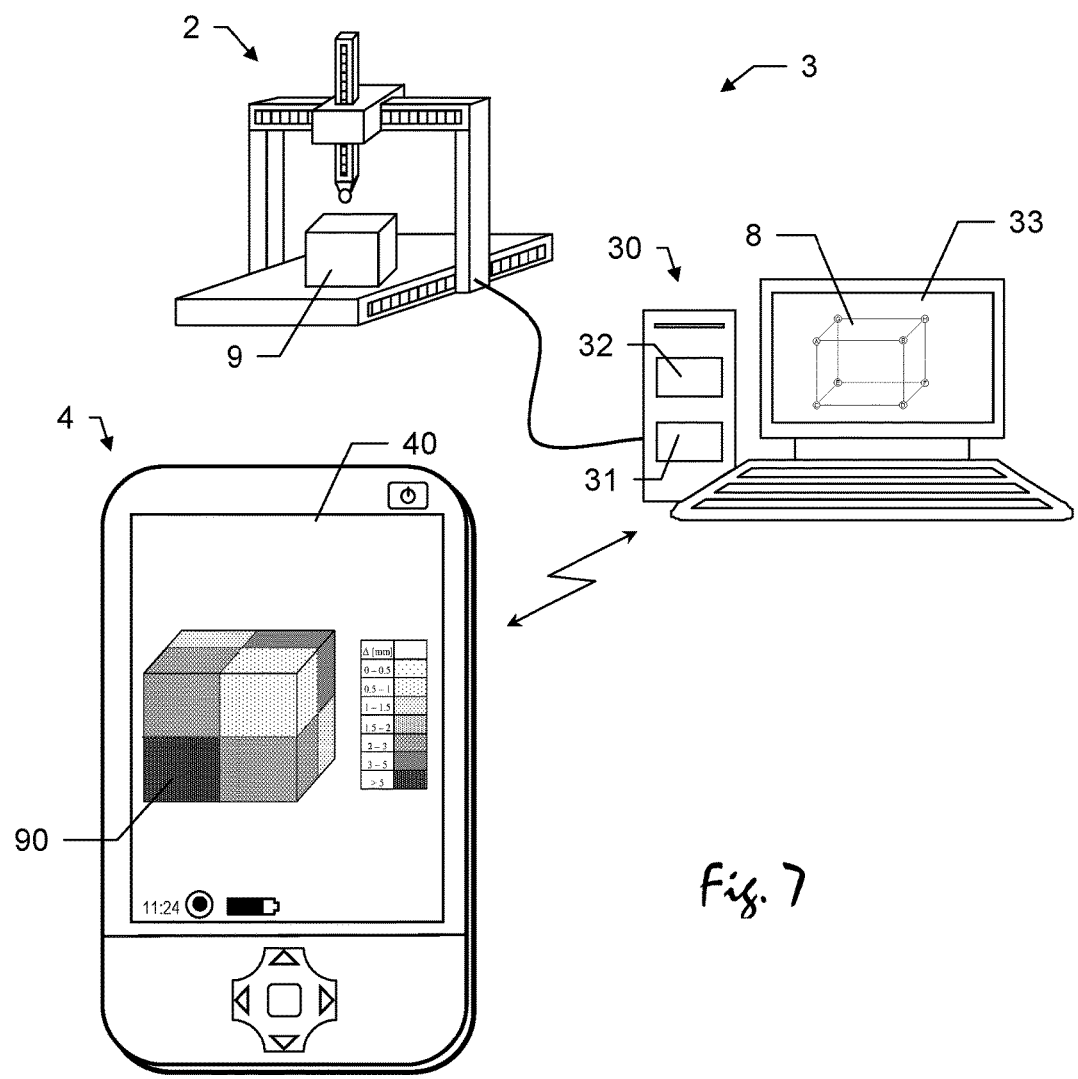

METHOD FOR VISUALIZING THREE DIMENSIONAL DATA

CROSS-REFERENCE TO RELATED APPLICATIONS

This application claims priority to European Patent Application No. 17156960.1 filed on Feb. 20, 2017, which is incorporated herein by reference.

FIELD OF INVENTION

The present invention pertains to a method and a system for visualizing deviations between nominal data and actual data of a three-dimensional object, particularly on a mobile device having limited computing resources. The total number of measurement points a subset is selected for displaying the deviation data of the measurement points of the subset. Also surface parameterization is used. The measurement results are displayed on the mobile device from discrete positions, visualized colour coded.

FIELD OF INVENTION

When mass producing components, there is a need to make sure the components match the respective reference models. It is therefore common practice during the industrial production of goods to measure features and properties of its different components. The purpose of such methods is to determine possible errors of the measured object after production. These measurements can be carried out by means of either contact or non-contact measuring gauges, for example based on laser or photogrammetric principles. Such a procedure, for instance, is disclosed in DE 195 44 240 A1.

U.S. Pat. No. 7,672,500 discloses a method for monitoring and visualizing the output of a production process, whose output materials or objects are inspected by one or more inspection units. The inspection units scan or otherwise inspect each of a series of objects or material being produced by a production process and an image is generated representing each of the inspected objects, wherein differences between the objects and information on the entire process can be visually coded.

This method is however designed for use with powerful computing means and large displays. Visualizing deviation data on light-weight mobile devices is a challenge, basically because of limited memory and/or computing capacity and the comparatively small displays of these devices.

BRIEF DESCRIPTION OF THE INVENTION

It is therefore an object of the present invention to provide an enhanced method for efficiently visualizing measured deviation on a virtual model.

It is a particular object of some embodiments of the invention to provide such a method for visualizing the deviation on a mobile device having limited memory and/or limited computing capacity.

It is a further object of some embodiments to provide such a method for visualizing the deviation on a mobile device using low end shader capable display hardware.

It is another object of some embodiments the invention to provide such a method that allows reducing data traffic in a network.

It is yet another object of some embodiments to provide such a method that reduces the amount of data that has to be stored on a mobile device.

Furthermore it is an object of some embodiments of the present invention to provide a system and a computer program product for execution of such a method.

A first aspect of some embodiments of the invention relate to a method for visualizing deviations between nominal data and actual data of a three-dimensional object. The method comprises providing deviation data for a multitude of measurement points on the surface of the object, the deviation data for each measurement point comprising a deviation value describing a deviation between a nominal value and a measured value. The method further comprises selecting a subset of the multitude of measurement points, the subset comprising a multitude of selected measurement points, assigning an index to each selected measurement point depending on the respective deviation value, generating a partitioned two-dimensional parameterized surface model of the object, wherein the surface model comprises a multitude of pixels, the selected measurement points are positioned on the surface model according to their position on the object, and each pixel is assigned the index of the nearest selected measurement point, and visualizing a representation of at least a part the object to a user, thereby visualizing at least a part of the pixels, each pixel being assigned an optical code according to its index.

In one embodiment the method according to the invention further comprises generating the surface model is performed in a computing device, visualizing the representation to a user is performed on a display of a mobile electronic device, and the method further comprises providing the surface model from the computing device to the mobile electronic device.

In some embodiments, the mobile electronic device is handheld and battery-operated, specifically a Smartphone or tablet computer.

In another embodiment of the method according to the invention, providing the deviation values comprises providing nominal data of the object, providing measured values of a multitude of measurement points on the surface of the object, and calculating deviations between the nominal data and the measured values of each measurement point.

In one embodiment of this method, providing the measured values comprises measuring values at the multitude of measurement points by means of a coordinate measuring device, the measured values particularly comprising at least one coordinate of each measurement point.

In another embodiment of the method according to the invention, selecting the subset of the multitude of measurement points is performed at least partially automatically, particularly fully automatically, by a computing device. In particular, selecting the subset is at least partially based on the deviation values.

In yet another embodiment of the method according to the invention, visualizing the representation comprises displaying a three-dimensional projection of the surface model.

In a further embodiment of the method according to the invention, assigning the optical code comprises defining a plurality of deviation ranges and assigning a colour, brightness or hatching value to each of the deviation ranges. Particularly, visualizing the representation comprises displaying a legend for illustrating the optical code.

A second aspect of some embodiments of the invention relates to system for visualizing deviation data of a three-dimensional object on a mobile electronic device. The system comprises a measuring device adapted to measure values at a multitude of measurement points on a surface of an object, and a computing device having storing means for storing nominal data of the object, the nominal data comprising nominal coordinates of the object, and calculation means for calculating deviations between the nominal data and the measured values.

According to some embodiments of the invention, the computing device is adapted to assign an index to selected measurement points depending on the respective deviation, the selected measurement points being a subset of the multitude of measurement points, to generate a partitioned two-dimensional parameterized surface model of the object, wherein the surface model comprises a multitude of pixels, the selected measurement points are positioned on the surface model according to their position on the object, and each pixel is assigned the index of the nearest selected measurement point, and to provide the surface model to the mobile electronic device.

In one embodiment of the system according to the invention, the system further comprising the mobile electronic device, wherein the mobile electronic device and the computing device comprise means for wireless communication with each other; and the mobile electronic device comprises a display for visualizing a representation of at least a part the object to a user, thereby visualizing at least a part of the pixels, each pixel being assigned an optical code according to its index.

In one embodiment, the mobile electronic device is handheld and battery-operated, particularly a Smartphone or tablet computer.

In another embodiment of the system according to the invention, the computing device is adapted to autonomously select a subset of the multitude of measurement points as selected measurement points, particularly wherein the selection is at least partially based on the calculated deviations.

In yet another embodiment of the system according to the invention, the measuring device is a coordinate measuring device, and the measured values comprise at least one coordinate of each measurement point.

In one embodiment, the coordinate measuring device is a laser tracker comprising a base defining an upright axis, a support which can be rotated relative to the base about the upright axis, and a telescope unit which can be rotated relative to the support about a tilt axis and has means for emitting a laser beam.

In another embodiment, the coordinate measuring device is a coordinate measuring machine comprising a base for supporting the object, and a drive mechanism, adapted to drive a probe head in a manner such that the probe head is capable to move relative to the base for approaching a measurement point on the object.

Some embodiments of the invention also relate to a computer program product, comprising program code which is stored on a machine-readable medium, or being embodied by an electromagnetic wave comprising a program code segment, and having computer-executable instructions for performing, in particular when run on calculation means of a computing device of a system according to the invention, the following steps of the method for visualizing deviation data of a three-dimensional object. When executed, the program code causes selecting a subset of the multitude of measurement points, the subset comprising a multitude of selected measurement points, generating a two-dimensional surface model of the object, wherein the surface model comprises a multitude of pixels, the selected measurement points are positioned on the surface model according to their position on the object, and each pixel is assigned an index depending on the deviation value of the nearest selected measurement point.

DESCRIPTION OF THE DRAWINGS

The invention in the following will be described in detail by referring to exemplary embodiments that are accompanied by figures, in which:

FIG. 6 shows a visualization of determined deviations in an object according to the invention; and FIG. 7 shows an exemplary embodiment of a system according to the invention.

DETAILED DESCRIPTION

Figure 1:
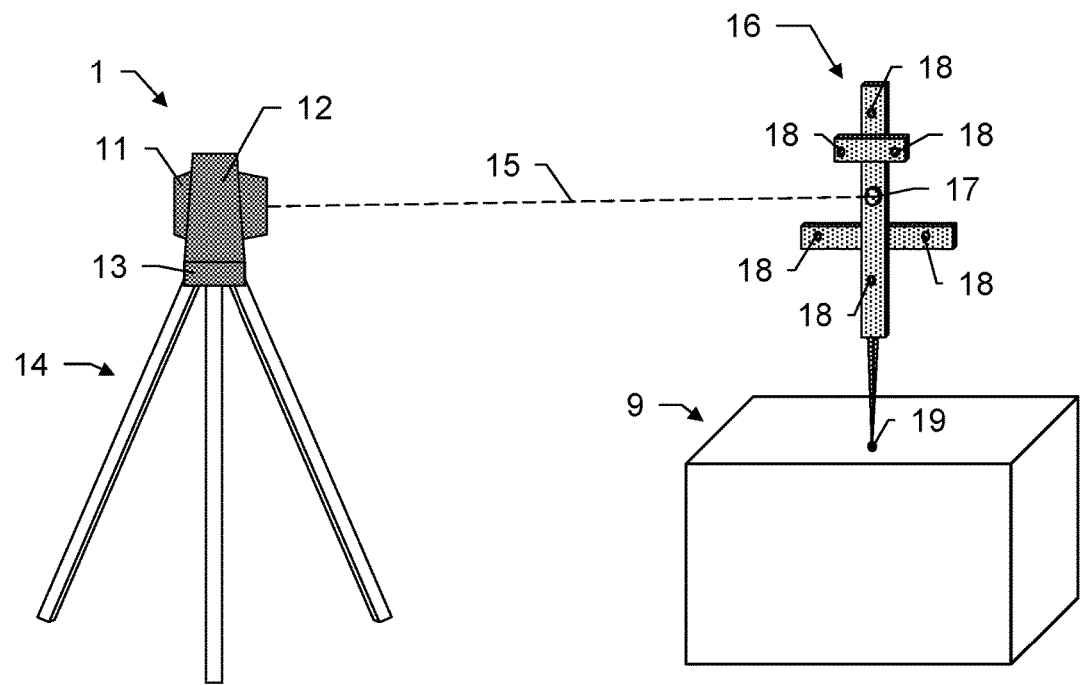
FIG. 1 shows a laser tracker as a first exemplary embodiment of a coordinate measuring device.
Figure 2:
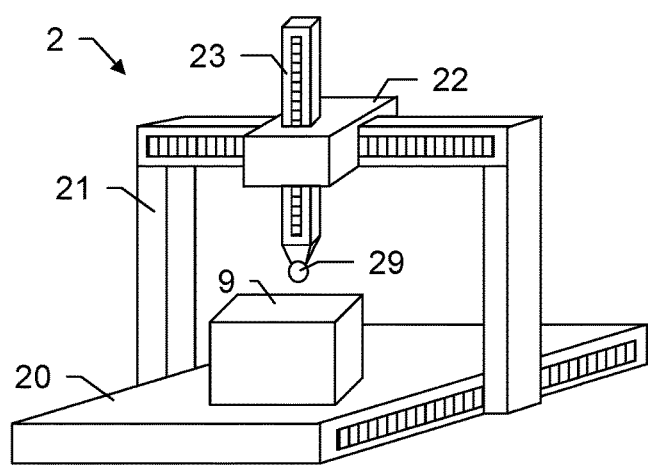
FIG. 2 shows a portal type coordinate measuring machine as a second exemplary embodiment of a coordinate measuring device.

In FIGS. 1 and 2 two exemplary coordinate measuring devices are illustrated that can be used with the method according to the invention or as part of the system according to the invention.

FIG. 1 shows a laser tracker 1 as a first exemplary embodiment of a coordinate measuring device. The depicted laser tracker device 1 comprises a laser guidance unit 11 which is mounted pivotable about a first axis on a support 12. The support 12 is mounted pivotable about a second axis which is basically orthogonal to the first axis on a base 13 which e. g. can be provided on a tripod 14.

The laser tracker 1 comprises an image detection unit and is adapted for use with an auxiliary measuring instrument 16, e. g. a contact sensing tool. The image detection unit can have a CMOS for the purpose of determining the position of a sensor exposure on the sensor or in a detected image or can be designed as a CCD or pixel sensor array camera. Such sensors allow a position-sensitive detection of detected exposure. Furthermore, the auxiliary measuring instrument 16 has a sensor, the contact point 19 of which can be brought into contact with a target object 9 to be measured. While this contact exists between the contact sensing tool 16 and the target object 9, a position of the contact point in space and thus the coordinates of a point on the target object 9 can be determined exactly. This determination is carried out by means of a defined relative positioning of the contact point with respect to the reflector 17 and with respect to the markings 18 arranged on the auxiliary measuring instrument 16, which markings 18 can be designed as light emitting diodes, for example. Alternatively, the markings 18 can also be designed in such a way that, upon illumination, e. g. with radiation having a defined wavelength, they reflect the impinging radiation (auxiliary point markings 18 designed as retroreflectors), in particular exhibit a specific luminous characteristic, or that they have a defined pattern or color coding. For this purpose, firstly the position of the reflector 17 or the position of the contact sensing tool 16 and secondly the spatial orientation thereof must be known.

For determining the position, a laser beam 15 is emitted by the laser tracker 1 in the direction of a reflector 17 arranged on the auxiliary measuring instrument 16, is reflected back from there to the tracker 1 in a parallel manner and is detected by means of a receiving unit on the tracker 1. The laser tracker 1 additionally has a distance measuring unit for determining a distance between the tracker 1 and the reflector 17, and goniometers, which make it possible to determine a position of a deflection mirror, by means of which the laser beam 15 can be aligned and guided in a defined manner, and thus a direction of propagation of the laser beam 15. The laser beam 15 can be aligned, in particular, by pivoting of a targeting unit, in which a beam-guiding optical unit and, in particular, a radiation source can be installed. This arrangement described makes it possible to precisely ascertain both the distance and the direction with respect to the reflector 17 or with respect to the contact sensing tool 16.

The orientation of the auxiliary measuring instrument 16 in space is discerned by means of the defined relative position and arrangement of the light emitting diodes 18 provided. For this purpose, an image of the auxiliary measuring instrument 16 with the light emitting diodes 18 is detected by the camera and analyzed according to the invention by an image processing unit. In particular, the image can be detected wavelength-selectively in such a way that the wavelength of the light emitted by the light emitting diodes 18 is detected by a sensor of the camera or is transmitted to the sensor by means of a filter assigned to the camera. The image analysis according to the invention is then carried out e. g. by the sensor being read out line by line, wherein in each line those pixels whose luminous properties lie above a specific threshold value are identified as relevant pixels. After the detection of these relevant pixels in a line, for each pixel collection a line segment (slice) with a respective centroid portion is ascertained and the next sensor line is subsequently examined. With such a systematic image or sensor signal analysis, all luminous points generated by the light emitting diodes 18 can be rapidly detected and localized in the image. From the arrangement of the points in the image, it is then possible to determine an orientation of the contact sensing tool 16 and, in joint consideration with the position of the reflector 17, the exact spatial position and orientation of the contact sensing tool 16 with six degrees of freedom (6-DoF). From the defined position of the contact point 19 with respect to the markings 18 and the reflector 17, a contact point position is thus likewise determined exactly.

FIG. 2 shows a portal type coordinate measuring machine 2 (CMM) as a second exemplary embodiment of a coordinate measuring device for use with the method and system according to the invention. The main components of this CMM 2 are a base 20 and a frame comprising three frame members 21,22,23. The frame is capable to move a probe head 29 in three dimensions to approach measurement points on an object 9 which is positioned on the base 20.

Driven by a drive mechanism (not shown), the first frame member 21 is capable to move along the longitudinal sides of the base 20. The movement of the frame member 21 is performed by a gear rack attached to the base 20, which is meshing with a pinion on the frame member 21. A second frame member 22 is movably arranged on a bridging portion of the first frame member 21. The movement of the second frame member 22 is also achieved by a rack and pinion. A vertical rod 23 as a third frame member is movably incorporated into the second frame member 22. At the bottom portion of the vertical rod 23 a probe head 29 is provided. The vertical rod 23 is also movable via rack and pinion. Thus, the probe head 29 is movable to any desired point in a work zone of the CMM 2.

Figure 3:
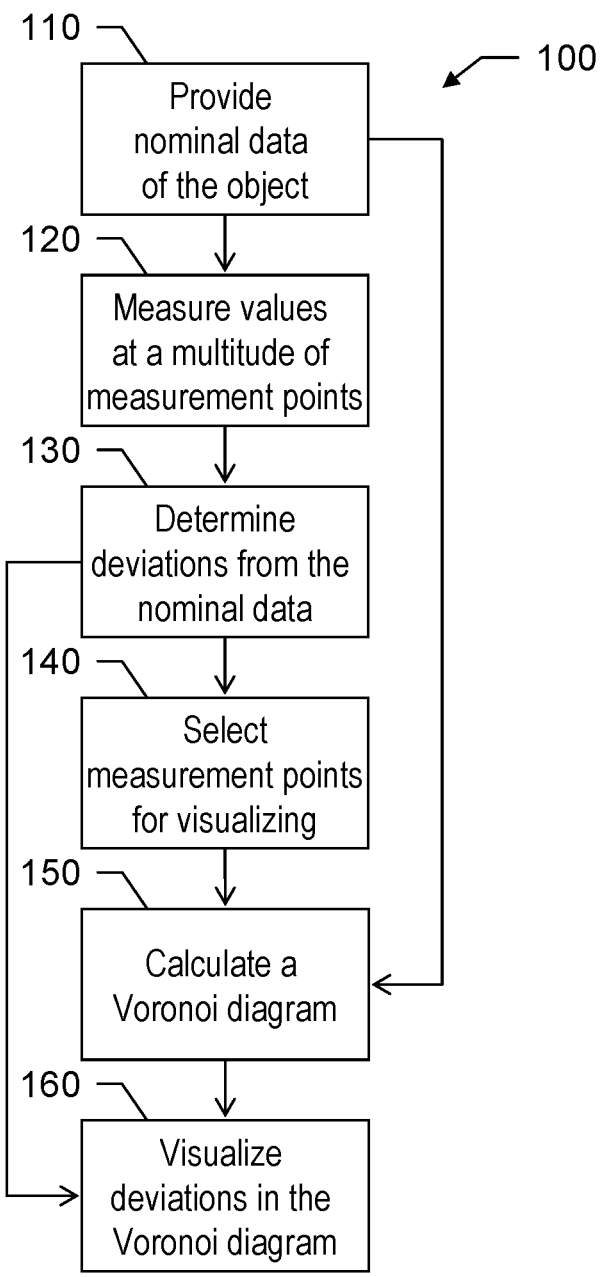
FIG. 3 shows a flow chart illustrating an exemplary embodiment of a method according to the invention.

FIG. 3 is a flow-chart illustrating steps of an exemplary embodiment of a method 100 for visualizing deviation data of a three-dimensional object according to the invention.

The depicted method 100 comprises the provision 110 of nominal data of an object to be measured. The nominal data can be provided as a model of the object comprising nominal values for a multitude of points of the object. The nominal data comprises at least nominal coordinates of these points and optionally further values such as physical characteristics of the object's surface.

The method 100 further comprises the measuring 120 of values at a multitude of measurement points of the object to be measured. These values can be the actual coordinates of these points or other actual values, the nominal equivalent of which are provided by the nominal data.

The method 100 then comprises the determination 130 of deviations of the measured actual values from the provided nominal values. Alternatively, the method may only comprise the provision of deviation values instead of measuring and calculating.

In a next step a number of measurement points is then selected 140 for visualization of deviations in the object—preferably automatically (or semi-automatically) by means of a computer. The selection is particularly based on the determined or provided deviations (possibly including a value distribution) and/or on properties of the mobile device on which the deviations will be displayed (e. g. resolution of the display, storing and calculation capacity, or data transfer speed).

The method 100 further comprises calculating 150 a Voronoi diagram on a parameterized surface of the object, wherein the selected measurement points are used as the seeds of the Voronoi cells. Each Voronoi cell is then assigned the deviation value of the respective measurement point.

Preferably, the parameterized surface is subdivided into a multitude of pixels. For each pixel of the surface, the nearest of the selected measurement points is determined (e. g. the measurement point with the least number of pixels between the measurement point and the respective pixel), and the deviation value—or an index based on this value—is encoded onto the respective pixel.

Finally, the method 100 comprises visualizing 160 the deviations on a mobile device in such a way that a representation of the object with the Voronoi cells is displayed from discrete positions to a user, wherein each pixel is assigned an optical code according to its deviation value (or index), particularly a certain colour. This way, the deviation value of each of the selected measurement points is visualized in such a way that the pixels of the Voronoi cell surrounding the measurement point are displayed with the same colour.

Figure 4A:
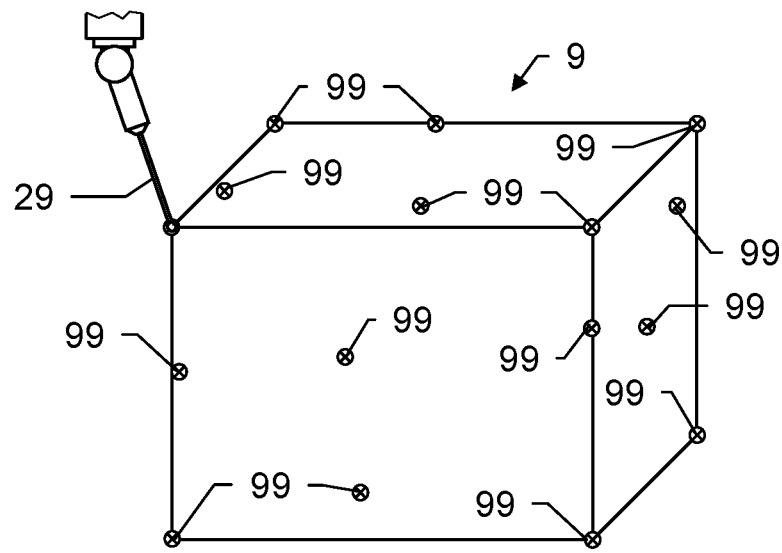
FIG. 4a shows an object with a multitude of measurement points to be measured by a coordinate measuring device.

FIG. 4a shows an object 9 to be measured, for instance a workpiece after production. A stylus 29 of a CMM measures values at a multitude of measurement points 99. For example, the measured values comprise spatial coordinates of each of the measurement points 99. Also other properties of the object can be measured at the measurement points, particularly any scalar value measured with a spatially stable sensor. These properties might comprise temperature, roughness, electrical resistance, degree of hardness etc.

The measured values are then compared to corresponding values provided by nominal data of the object, and a deviation value describing the deviation from a nominal value (e. g. an optimal value or a threshold value) is assigned to each of the measurement points. Obviously, if more than one value is measured at each measurement point 99 for which a deviation from the nominal data is determinable, more than one deviation value can be assigned.

Figure 4B:
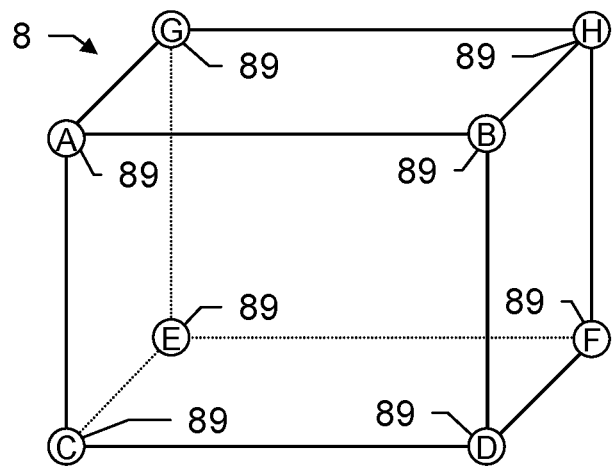
FIG. 4b shows a three-dimensional model of the object to be measured with a number of selected measuring points.

FIG. 4b shows a three-dimensional model 8 of the object 9 of FIG. 4a. Nominal data of the object is provided together with the model 8. For allowing visualization of the determined deviations on a mobile device, a suitable number of measurement points 89 (labelled with capital letters "A" to "G") are selected from the multitude of measurement points 99 on the object's surface. The deviation value (or a selected deviation value if more than one is available) is assigned as an index to each of the selected measurement points 99.

For simplifying reasons, the depicted object 9 is a cuboid and the eight selected points 89 are positioned at the cuboid's corners. Of course, the object 9 can be a workpiece of any three-dimensional shape, and the selected points 89 can as well be distributed differently on the object's surface and need not to be positioned at corners or edges.

Figure 5A:
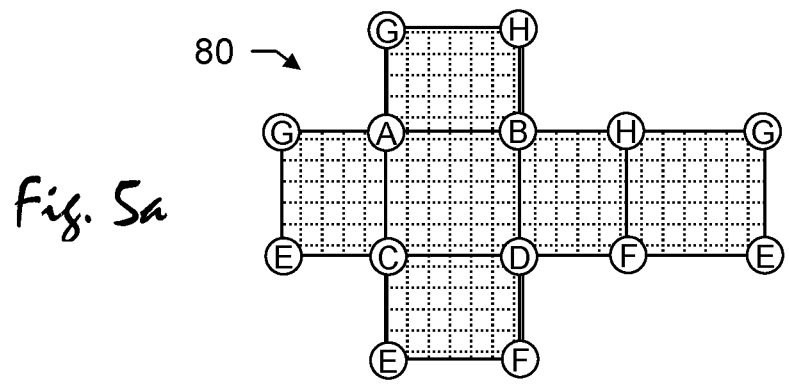
FIG. 5a shows a two-dimensional representation of the three-dimensional surface of an object with the selected measuring points.
Figure 5B:
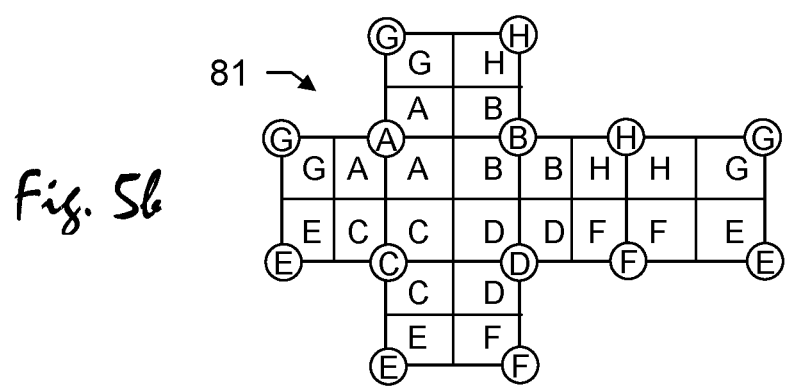
FIG. 5b shows the representation of FIG. 5a, a Voronoi diagram being calculated with the selected measurement points as centre points.
Figure 5C:
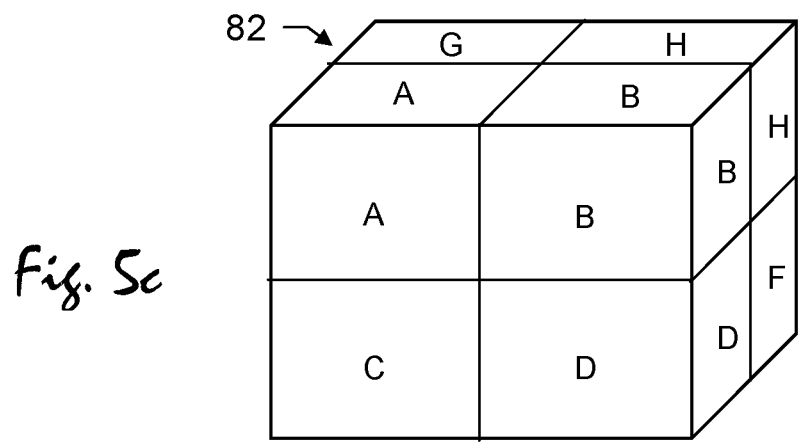
FIG. 5c shows a three-dimensional version of the representation of FIG. 5b.

FIGS. 5a-c illustrate steps of an exemplary method according to the invention that allows a more advantageous visualization of the deviation data.

The method uses surface parameterization to enable selecting measurement points to be used when displaying the results. It is used for showing measurement results from discrete positions, visualized colour coded on a mobile device. The principle of the method is to make the visualization independent from the number of measurement points. This works by finding out during rasterization (per pixel) which measurement points to use.

In the illustrated steps of FIGS. 5a-c, from the provided reference model, a virtual model is created and its surface is parameterized uniquely onto a 2D surface 80 which is composed of a multitude of pixels. A suitable resolution is picked for the 2D surface 80, particularly depending on the storing capacity of the mobile device and/or the resolution and size of its display on which the deviations are to be visualized. The coverage is most important; the parameterization only needs to be of fair quality in terms of tilt and scale, as the main interest is related to the border conditions.

In FIG. 5a, a parameterization 80 (i.e. a two-dimensional model) of the surface of the three-dimensional model of the object of FIG. 3a is shown. The eight points "A" to "G" represent the selected measuring points. The surface of the model is parameterized, so that each position on the surface can be identified on a 2D image surface.

On this parameterized surface model 80 for each pixel the nearest selected point is found and its index (based on the deviation value) is encoded onto the pixel ("look-up image"). The task is to create a "low grade" surface parameterization and to find the closest point to each pixel on the look-up image. In other words, a Voronoi diagram 81 is calculated on the surface model 80 with the selected measurement points as seeds (centre points) of the Voronoi cells. This is illustrated in FIG. 5b. This process serves for encoding the deviation index onto the surface parameterization. Additionally, the actual Voronoi diagram can be used as an acceleration structure. Whereas in FIG. 5a the single pixels are shown, in FIG. 5b for clarity reasons only pixel groups belonging to the same Voronoi cell, i.e. having the same index assigned, are shown.

A 2D surface with the 3D positions of the selected measurement points is encoded ("position image"), so that the position of each selected measurement point matches the index given by the Voronoi intersection. This data is then prepared and saved for later retrieval on a display device.

The position of each of the selected measurement points 89 is encoded in the position image. The position is thus according to the point's index, and not its position in 3D space or 2D space. All attributes of the selected measurement points 89 are stored with this layout. The position image format e. g. can be IEEE 754 floating point format.

A possible method that can be used for creating the position image is described in the paper "A fast and simple stretch-minimizing mesh parameterization" by Shin Yoshizawa, Alexander Belyaev, and Hans-Peter Seidel. An alternative method comprises grouping triangles by the dominant component of the surface normal, and packing this with a bin packing algorithm, such as a "first fit" algorithm.

The 2D surface with the Voronoi diagram 81 is then projected back on the three-dimensional model to form the 3D Voronoi partitioned model 82 of FIG. 5c.

The measurement results are encoded as a deviation from the ideal value—preferably scaled to a suitable range. The result is written to another surface ("measurement image") matching the position image.

Optionally, a legend ("value representation image") can be created to represent the values, e. g. a 1D image with green pixels at the one end representing a "healthy" value (small deviation), and red pixels at the other end indicating danger levels (large deviation).

Instead of having to send the model data as well as the deviation data, only the parameterized model, the look-up image, the position image, the measurement image, and optionally the value representation image are sent to the mobile device for visualization. Advantageously, this does not only reduce the necessary data traffic but also data storing capacity as well as calculation time and effort in the mobile device.

FIG. 6 shows an exemplary visualization of the determined deviations according to the invention. The visualization comprises a three-dimensional representation 90 of the object based on the provided object model. The representation 90 is visualized according to the partitioning of the 3D Voronoi model 82 of FIG. 5c. This means that every pixel of the representation 90 is visually coded according to the assigned index.

When the representation is drawn, the selected measurement point per fragment can be found on the look-up image. The position image will provide the actual 3D position of the selected measurement point, enabling to draw a representation of this point. The measurement image provides the value that is to be presented. This allows drawing a model with a large number of measurement points but only having to consider a single measurement point per fragment, making it a viable option on very light weight devices. Advantageously, when a new set of measuring data is created, only the measurement image needs to be submitted to the device.

For visualizing the determined deviations, the deviation values of the measurement points are assigned to the respective Voronoi cell 92. Each measurement point is thus represented by the surrounding Voronoi cell 92 that is coloured according to the deviation determined for the respective measurement point. A legend 95 can be displayed next to the representation 90 to show the meaning of the respective colours. Obviously, also hatching or brightness values can be used instead of colours. Direct lighting can be used to help visualizing the surface contours of the model.

FIG. 7 shows an exemplary embodiment of a system 3 for visualizing deviation data of a three-dimensional object according to the invention. The depicted system comprises a coordinate measuring device, in this example embodied by the CMM 2 of FIG. 2, and a computing device 30. The CMM 2 is used for measuring values at measuring points of an object 9.

The computing device 30 comprises storing means 31, e.g. a hard disk drive, for storing nominal data such as a model of the object 9, calculation means 32, e.g. a processor, for calculating deviations between the nominal data 8 and the measured values, and optionally displaying means 33, such as a monitor or other visual display unit, for displaying a model 8 of the object or other data to a user.

The calculation means 32 is adapted to assign an index to selected measurement points depending on their respective deviation values, wherein the selected measurement points are a subset of the entirety of measurement points. Further, the calculation means 32 is adapted to generate a two-dimensional surface model of the object, wherein the surface model is composed of a multitude of pixels and the selected measurement points are positioned on the surface model according to their position on the object (as shown in FIG. 5*a*). The calculation means 32 is also adapted to assign each pixel the index of the nearest selected measurement point (as shown in FIG. 5*b*).

A mobile electronic device 4 comprises a display 40 for visualizing the colour coded representation 90 of FIG. 6—showing at least a part the object 9—to a user. Compared to the computing device 30, the mobile device 4 has a much smaller memory and computing capacity and comprises only low-end shader capable display hardware. Also the display 40 is much smaller than the computer monitor 33.

Therefore, the calculations are performed in the computing device, and the prepared data is provided to the electronic device 4 for displaying.

The computing device 30 and the mobile electronic device 4 comprise means for wireless communication with each other, and the computing device 30 is adapted to provide the calculated surface model—or parts thereof—to the mobile device 4.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for visualizing deviations between nominal data and actual data of a three-dimensional object, the method comprising:
    providing deviation data for a multitude of measurement points on the surface of the object, the deviation data for each measurement point comprising a deviation value describing a deviation between a nominal value and a measured value;
    selecting a subset of the multitude of measurement points, the subset comprising a multitude of selected measurement points;
    generating a two-dimensional surface model of the object, wherein:
        the surface model comprises a multitude of pixels,
        the selected measurement points are positioned on the surface model according to their position on the object, and
        each pixel is assigned an index depending on the deviation value of the nearest selected measurement point; and
    visualizing a representation of at least a part of the object to a user, thereby visualizing at least a part of the pixels, each pixel being assigned an optical code according to its index.

2. The method according to claim 1, wherein:
    generating the surface model is performed in a computing device;
    visualizing the representation to a user is performed in a mobile electronic device having a display; and
    the method further comprises providing the surface model or parts thereof from the computing device to the mobile electronic device.

3. The method according to claim 1, wherein providing the deviation data comprises:
    providing nominal data of the object;
    providing measured values of the multitude of measurement points on the surface of the object; and
    calculating deviations between the nominal data and the measured values of each measurement point.

4. The method according to claim 3, wherein providing the measured values comprises measuring values at the multitude of measurement points by means of a coordinate measuring device.

5. The method according to claim 1, wherein selecting the subset of the multitude of measurement points is performed at least partially automatically by a computing device.

6. The method according to claim 1, wherein visualizing the representation comprises displaying a three-dimensional projection of the surface model.

7. The method according to claim 1, wherein assigning the optical code comprises defining a plurality of deviation ranges and assigning a colour, brightness or hatching value to each of the deviation ranges.

8. A system for visualizing deviations between nominal data and actual data of a three-dimensional object on a mobile electronic device, the system comprising:
    a measuring device adapted to measure values at a multitude of measurement points on a surface of an object; and
    a computing device having a storing means for storing nominal data of the object, the nominal data comprising nominal coordinates of the object, and a calculation means for calculating deviations between the nominal data and the measured values,
    wherein the computing device is adapted to:
        assign an index to selected measurement points depending on the respective deviation, the selected measurement points being a subset of the multitude of measurement points,
        generate a two-dimensional surface model of the object, wherein the surface model comprises a multitude of pixels, and the selected measurement points are positioned on the surface model according to their position on the object, and each pixel is assigned the index of the nearest selected measurement point, and
        provide the surface model or parts thereof to the mobile electronic device.

9. The system according to claim 8, further comprising the mobile electronic device, wherein:
    the mobile electronic device and the computing device are configured for wireless communication with each other; and
    the mobile electronic device includes a display for visualizing a representation of at least a part the object to a user, thereby visualizing at least a part of the pixels, each pixel being assigned an optical code according to its index.

10. The system according to claim 9, wherein the mobile electronic device is a handheld and battery-operated smartphone or tablet computer.

11. The system according to claim 8, wherein the computing device is adapted to automatically select the subset of the multitude of measurement points as selected measurement points, the selection being at least partially based on the calculated deviations.

12. The system according to claim 8, wherein:
the measuring device is a coordinate measuring device; and
the measured values comprise at least one coordinate of each measurement point.

13. The system according to claim 12, wherein the coordinate measuring device is a laser tracker comprising:
a base defining an upright axis,
a support which can be rotated relative to the base about the upright axis, and
a telescope unit which can be rotated relative to the support about a tilt axis and has means for emitting a laser beam.

14. The system according to claim 12, wherein the coordinate measuring device is a coordinate measuring machine comprising:
a base for supporting the object, and
a drive mechanism, adapted to drive a probe head in a manner such that the probe head is capable to move relative to the base for approaching a measurement point on the object.

15. A computer program product, comprising program code which is stored on a machine-readable medium and having computer-executable instructions for performing:
selecting a subset of the multitude of measurement points, the subset comprising a multitude of selected measurement points; and
generating a two-dimensional surface model of the object, wherein the surface model comprises a multitude of pixels, the selected measurement points are positioned on the surface model according to their position on the object, and each pixel is assigned an index depending on the deviation value of the nearest selected measurement point.

* * * * *